United States Patent [19]

Dirkin et al.

[11] Patent Number: 4,777,869
[45] Date of Patent: Oct. 18, 1988

[54] FLUID ACTUATOR INCLUDING A COMPOSITE PISTON ROD

[75] Inventors: William Dirkin; James N. Tootle, both of Portage; Duane Douglass, Vicksburg; Terry L. Benton, Portage, all of Mich.

[73] Assignee: Pneumo Abex Corporation, Boston, Mass.

[21] Appl. No.: 845,844

[22] Filed: Mar. 28, 1986

[51] Int. Cl.$^4$ ................................................. F16J 9/00
[52] U.S. Cl. ........................................ 92/248; 92/255; 138/31; 29/156.5 A
[58] Field of Search ................. 92/241, 248, 254, 259, 92/137, 255, 128; 285/149; 138/31 X, 174, DIG. 2; 29/156.5 A X, 419 R, 419 G, DIG. 25

[56] References Cited

U.S. PATENT DOCUMENTS

| | | | |
|---|---|---|---|
| 2,853,319 | 9/1958 | Press | 285/149 X |
| 3,040,712 | 6/1962 | Harrah | 92/248 X |
| 3,326,092 | 6/1967 | Murphy | 92/255 X |
| 3,333,778 | 8/1967 | Levenetz et al. | 242/3 |
| 3,698,264 | 10/1972 | York | 92/151 X |
| 3,783,620 | 1/1974 | Moe | 92/151 X |
| 4,211,589 | 7/1980 | Fisher et al. | 29/419 G X |
| 4,272,971 | 6/1981 | Loyd et al. | 138/174 X |
| 4,315,454 | 2/1982 | Knödel | 92/170 |
| 4,329,915 | 5/1982 | Schulz | 29/156.5 A X |

FOREIGN PATENT DOCUMENTS 3587 9/1885 United Kingdom ................ 92/255

Primary Examiner—Robert E. Garrett
Assistant Examiner—Mark Williamson
Attorney, Agent, or Firm—Renner, Otto, Boisselle & Sklar

[57] ABSTRACT

Fluid actuator includes a piston rod comprised of a wound filamentary composite structure to provide an extremely light weight, relatively low cost, envelope efficient design. Attached to the piston rod are one or more non-integral piston heads which are preloaded against one or more ramp surfaces on the exterior of said piston rod. A pair of oppositely facing ramp surfaces may be formed on the piston rod by interspersing filler means between the piston rod fiber layers. Another ramp area may be formed by providing an external groove in the piston rod which is engaged by longitudinally split support shoes that provide an attachment surface for a detachable piston head. An internal ramp may also be provided on the inner diameter of the piston rod adjacent the axial outer end thereof for mating engagement by a conically ramped exterior surface on an internal metal stud used to attach a rod end assembly to the axial outer end of the piston rod. The internal ramp may be formed by radially displacing the layers of piston rod fibers radially inward by interspersing circumferential fiber windings therebetween.

39 Claims, 2 Drawing Sheets

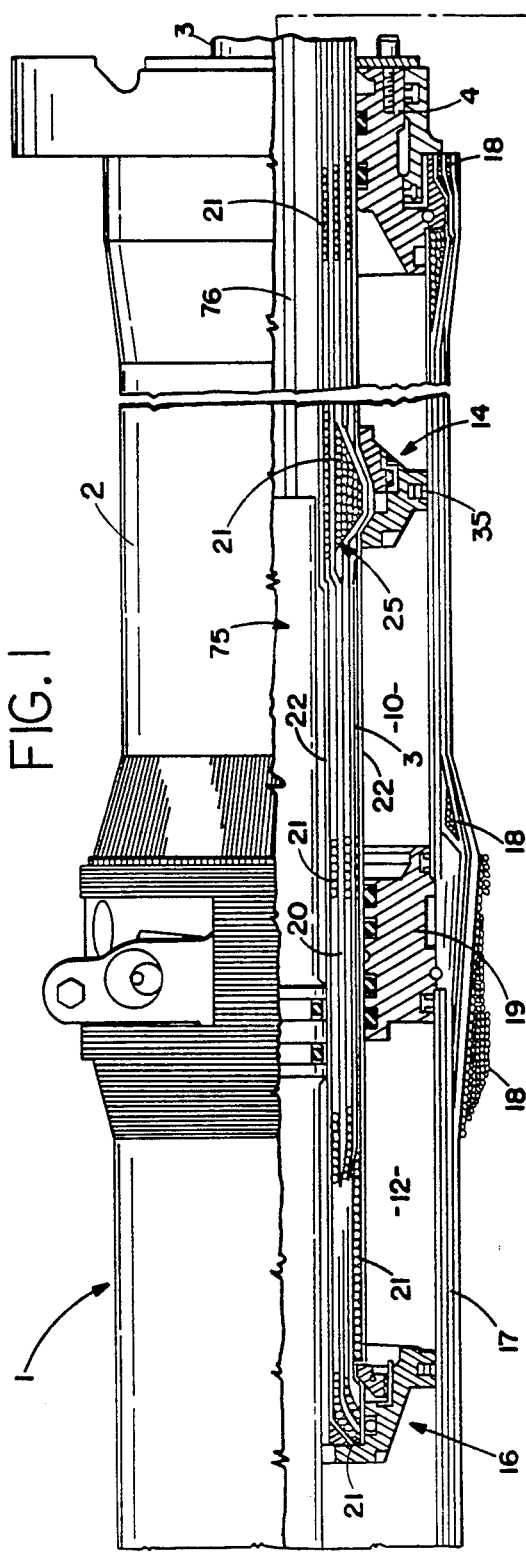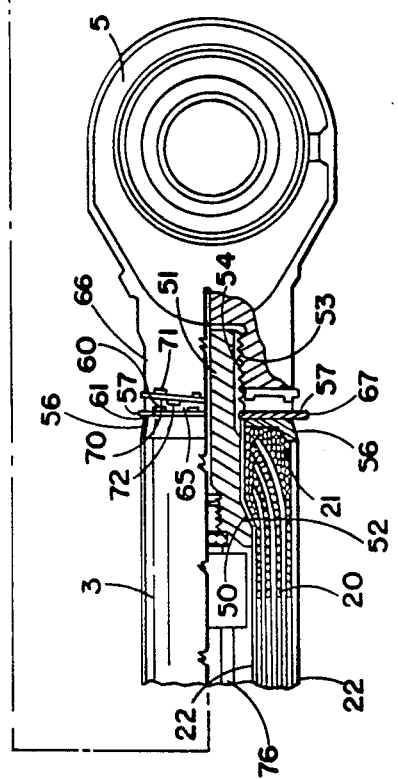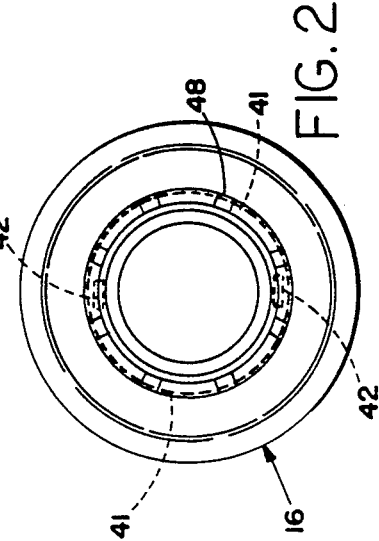

FLUID ACTUATOR INCLUDING A COMPOSITE PISTON ROD

BACKGROUND OF THE INVENTION

This invention relates generally as indicated to a fluid actuator, and, more particularly, to a fluid actuator including a composite piston rod which incorporates methods of attachment of one or more non-integral piston heads in order to efficiently utilize the directional composite material, and to simplify fabrication.

In copending U.S. patent applications Ser. Nos. 642,539, now U.S. Pat. No. 4,697,499, dated Oct. 6, 1987, and 642,540, both filed Aug. 20, 1984, such latter application having been abandonded in favor of a continuation application Ser. No. 834,501, filed Feb. 28, 1986, now U.S. Pat. No. 4,685,384, dated Aug. 11, 1987, and assigned to the same assignee as the present application, there are shown several different fluid actuator designs intended for use in flight controls of aircraft and other high pressure applications in which the cylinder walls are made of relatively high strength to weight composite materials in order to obtain a substantial reduction in the weight of the cylinders without sacrificing strength.

By the same token, it would be desirable to make the piston rod out of similar type composite materials so that the weight of the rod, like that of the cylinder, could also be substantially reduced. Moreover, it would be desirable to provide for the attachment of one or more non-integral piston heads to the composite rod structure in order to efficiently utilize the directional composite material, and to simplify fabrication. Also, it would be desirable to provide such a composite piston rod with the requisite sealing and rod end attachments along with increased fatigue resistance, damage tolerance, and ballistic tolerance.

SUMMARY OF THE INVENTION

In accordance with one aspect of the present invention, the piston rod is comprised of a wound filamentary composite structure to provide an extremely light weight, relatively low cost, envelope efficient design.

Also in accordance with the invention, the composite rod structure provides for fatigue resistance, damage tolerance, and ballistic tolerance.

Further in accordance with the invention, the composite rod structure provides for the attachment of one or more non-integral piston heads to efficiently utilize the directional composite material and to simplify fabrication.

Still further in accordance with the invention, the composite rod provides for the requisite sealing and rod end attachments.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a fragmentary longitudinal section through one form of fluid actuator including a preferred form of composite piston rod constructed in accordance with this invention;

FIG. 2 is an end elevation view of the axial inner end of the piston rod of FIG. 1 as seen from the plane of the line 2—2 thereof;

DETAILED DESCRIPTION OF THE PREFERRED EMBODIMENT

Figure 3:
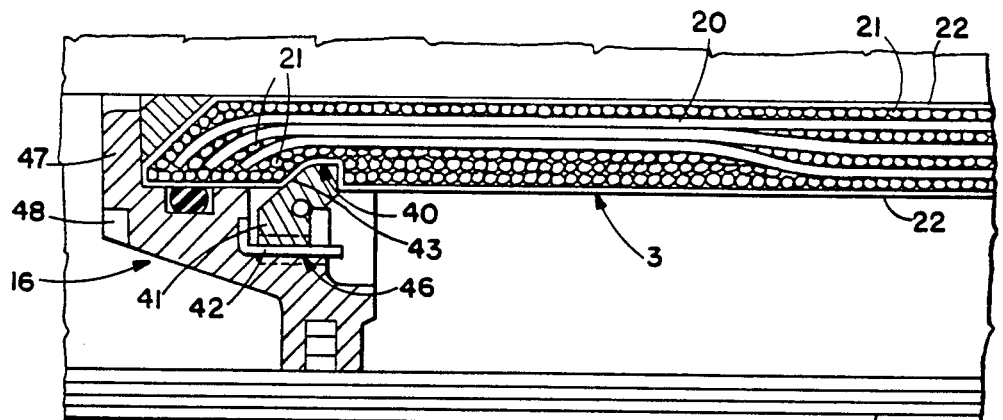
FIG. 3 is an enlarged fragmentary longitudinal section through the axial inner end of the piston rod showing how a non-integral piston head may be attached thereto.

Referring now in detail to the drawings, and initially to FIG. 1, there is shown one form of fluid actuator 1 in accordance with this invention including a cylinder 2 containing a piston rod 3 extending through an end wall or gland 4 at the outboard end of the cylinder. At the outermost end of the rod is a rod end assembly 5 which is adapted to be attached to a movable part to be actuated. At the inboard end of the cylinder is a suitable mount (not shown) for attachment to the stationary part of the device to be actuated.

The fluid cylinder 2 shown is a dual tandem cylinder containing a pair of fluid chambers 10, 12 in series and having respective pistons 14, 16 connected to a common ram output rod 3 for common movement therewith. In service, the two chambers may be used in tandem or independently, to extend or retract the rod, or provide a compressive or tension load. The particular structure of the cylinder itself forms no part of the present invention and therefore will not be described in detail. Suffice it to say that the cylinder 2 is desirably constructed of relatively high strength to weight longitudinal and/or biased and circumferential hoop fibers 17, 18 of suitable composite materials in order to obtain a substantial reduction in the weight of the cylinder without sacrificing strength. Examples of such a cylinder construction are disclosed in the aforementioned U.S. Pat. Nos. 4,697,499 and 4,685,384 which are incorporated herein by reference.

As shown, the two fluid chambers 10, 12 (hereinafter referred to as the head end chamber and rod end chamber, respectively) are separated by a center gland or dam 19 having a central opening through which the piston rod 3 extends, with suitable seals therebetween.

In accordance with the present invention, the piston rod 3, rather than being made of metal as is the usual case, consists of a plurality of layers of longitudinal (or nearly longitudinal) and circumferential fibers 20 and 21 forming a composite structure throughout the length of the piston rod. Such longitudinal and circumferential fibers may be made of a suitable composite material having the required high tensile strength such as high modulus graphite filament wound epoxy impregnated fibers which may be protected from handling damage by a thin layer of fiberglass reinforced composite. Also, a suitable coating, plating or shell 22 may be provided on both the outer diameter (O.D.) and inner diameter (I.D.) of the piston rod in order to provide a sealing surface against fluid intrusion into the piston rod composite material.

The longitudinal fiber layers 20 run lengthwise of the rod to react the axial tension loads, whereas the circumferential fiber layers 21 are desirably wrapped around the I.D. and O.D. and may also be wrapped in between the longitudinal fiber layers to provide resistance to radial pressure and react axial compression loads through the rod. Preferably, approximately one-half of the normal cross-sectional area of the piston rod is comprised of longitudinal fibers, whereas the circumferential fibers are distributed more or less according to their intended purpose along the length of the rod as described hereafter.

Figure 4:
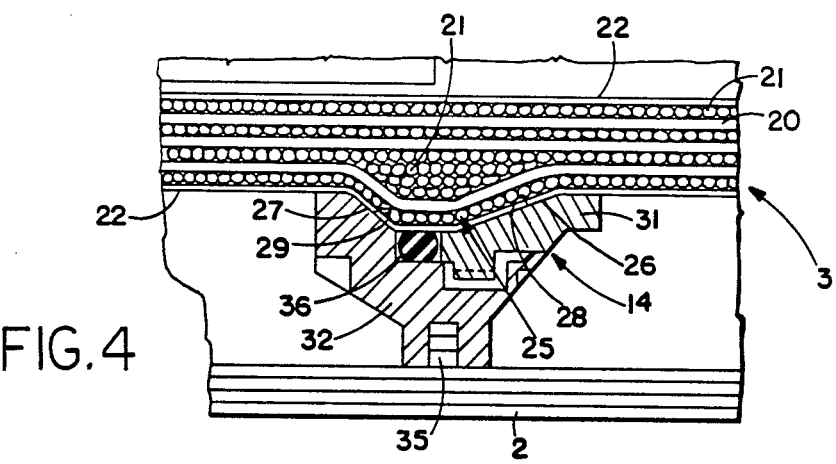
FIG. 4 is an enlarged fragmentary longitudinal section through an intermediate portion of the piston rod showing how another non-integral piston head may be attached to the rod.

Throughout the major portion of the length of the piston rod, the circumferential fibers 21 comprise the other half of the cross-sectional area of the piston rod 3. However, at certain points along the length of the piston rod there may be more or less circumferential fibers depending on the rod configuration. In the preferred embodiment shown herein, one such area is located intermediate the length of that portion of the piston rod 3 extending through the head end chamber 10 wherein there is a relatively short, radially outwardly extending built-up area 25 extending circumferentially around the rod for a purpose to be subsequently described. The built-up area 25 may be formed by progressively wrapping additional circumferential or hoop stress windings 21 between the longitudinal fibers 20 from opposite ends of the built-up area toward the center to cause outward deflection of the outermost layers of longitudinal fibers and/or circumferential fibers beyond the normal outer dimension of the rod. As best seen in FIG. 4, the layers of fibers 20, 21 are progressively built up toward the center to form two oppositely facing ramp surfaces 26, 27 in the composite material on the O.D. of the rod for mating engagement by correspondingly shaped ramps 28, 29 of a two-part piston head 14. The piston head parts 31, 32 may be preloaded into the ramps 26, 27 as by bolting or threading the two parts together to eliminate possible free play.

The piston head 14, in addition to carrying the usual external piston rod seal 35, also desirably incorporates an internal seal 36 for sealing engagement with the exterior surface of the piston rod built-up area 25 to prevent across-the-head leakage.

Adjacent the inner end of the piston rod 3 an external groove 40 may be provided for engagement by a pair of longitudinally split support shoes 41 held together as by pins 42 (see FIGS. 2 and 3). The longitudinal tension fibers 20 are brought closer together, by eliminating circumferential fibers 21 where necessary, to permit the longitudinal fibers to pass radially inwardly beneath the external groove 40. Adjacent the opposite (inner) side of the groove, the longitudinal fibers 20 are turned outward by interspersing additional circumferential supporting hoop fibers 21 between the longitudinal fibers to form a ramped area 43 along one side of the groove 40 for interface with the longitudinally split support shoes 41. Additional circumferential fibers 21 (or other similar filler material) may be included where necessary to fill out the normal rod thickness adjacent the other side of the external groove 40 as shown.

The purpose of the external groove 40 and associated support shoes 41 is to hold in place on the inner end of the rod 3 another detachable piston head 16 which may have a threaded counterbore 46 in one end for threaded engagement onto the support shoes. At the inner end of the piston head 16 opposite the counterbore 46 is an inturned flange 47 which engages the innermost end of the piston rod 3 during tightening of the piston head onto the support shoes to provide a preload force on the piston head. Wrenching slots 48 may be provided in the inner end of the piston head 16 to facilitate assembly and removal of the piston head from the rod.

At the outer end of the rod 3 is the rod end assembly 5 which may be made of metal. To attach the metal rod end assembly 5 to the composite rod structure, an internal ramp 50 (see FIGS. 1 and 5) is desirably formed on the I.D. of the piston rod adjacent the outer end thereof by radially displacing the longitudinal windings 20 inward as by interspersing additional circumferential windings or other suitable filler material 21 therebetween. An internal metal stud 51 is either wound in or inserted within the hollow I.D. of the piston rod 3, and has a conically ramped exterior surface 52 adjacent the inner end thereof for mating engagment with the internal ramp 50 on the piston rod. The outer end of the metal stud 51 protrudes axially outwardly beyond the outer end of the piston rod and is externally threaded at 53 for threaded engagement by internal threads 54 on the metal rod end assembly 5 to impart tension loads through the threads into the stud and then into the longitudinal fibers 20 through the mating ramp surfaces 50, 52.

Figure 5:
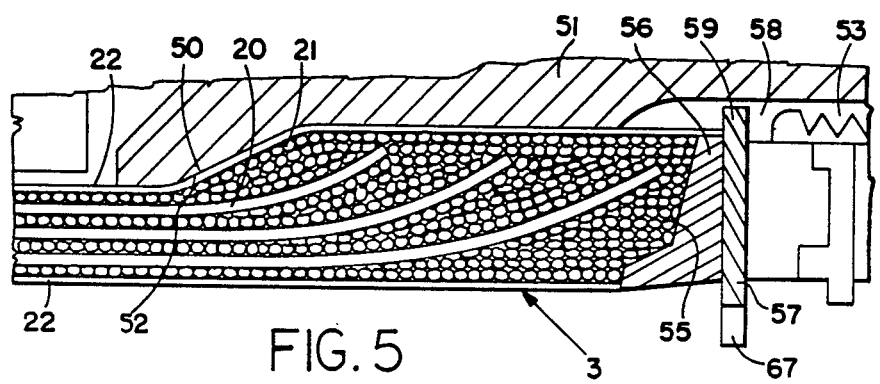
FIG. 5 is an enlarged longitudinal fragmentary section through the axial outer end of the piston rod showing the manner of attachment of a metal rod end assembly thereto.

A compression load from the rod end assembly 5 may be reacted into the outer end of the composite rod 3 by providing a stepped shoulder 55 at the outer end of the composite rod which is engaged by a correspondingly shaped end of a metal washer 56 (see FIG. 5). The other (outer) end of the metal washer 56 may be flat for flat engagement by a flat washer 57. Locking of the rod end assembly 5 to the stud 51 to prevent relative rotation therebetween may be accomplished by providing a keyway 58 on the stud 51 which is engaged by a key (tab) 59 on the I.D. of the washer 57 and bending deformable tabs 60 on the washer 57 into slots 61 on the rod end assembly 5 (see FIG. 1).

To preload the stud 51 so that the stud does not fail out due to cycling fatigue, the rod end assembly 5 may include a spiral washer 65 between the flat washer 57 and the inner end of the rod end 66. As shown in FIG. 1, the adjacent ends of the spiral washer and rod end have a matching spiral (cam) shape, whereby rotation of the rod end 66 relative to the spiral washer 65 will cause the rod end to move axially away from the stud to apply a preload force to the stud.

The opposite (inner) end of the spiral washer 65 has the circumferentially spaced slots 61 therein for engagement by the tabs 60 on the flat washer 57 to prevent relative rotation therebetween. On the O.D. of the flat washer 57 are a plurality of circumferentially spaced fingers 67 which may be engaged by a suitable tool to resist turning of the spiral washer 65 during relative rotation of the rod end 66 to place the stud 51 in tension. Thereafter, a C-washer 70 having tabs 71, 72 on opposite sides thereof may be placed over the rod end assembly 5 and its tabs 71, 72 bent into respective slots in the adjacent ends of the rod end 66 and spiral washer 65 to lock the rod end against further rotation relative to the spiral washer.

To form the composite piston rod 3, the composite fibers 20, 21 (including the filler material) may be wound on a mandrel or other suitable device and then placed in an oven and heated to a temperature sufficient to cause the composite fibers to bond together. Thereafter, the non-integral piston heads 14, 16 may be attached to the piston rod 3 and the metal rod end assembly 5 connected to the rod end in the manner previously described. Also, if desired, a linear variable differential transformer (LVDT) 75 may be installed internally within the hollow piston rod 3 with its movable core 76 attached to the internal metal stud 51 as further shown in FIG. 1 for position sensing.

From the foregoing, it will now be apparent that both tension and compression loads may be introduced into the composite piston rod of the present invention which includes not only longitudinal or biased fibers but also circumferential hoop fibers that not only fill the voids between the longitudinal fibers, but also effect the desired radial displacement of the longitudinal fibers where necessary and stabilize the longitudinal fibers in order to react compression loads. Also, one or more metal piston heads may be attached to the composite piston rod to form a single or dual stage fluid cylinder in which the loads generated by the fluid pessure acting on the attached piston heads is reacted through the composite piston rod.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

What is claimed is:

1. In a fluid actuator, a cylinder including a fluid chamber for receiving a piston-rod assembly, said piston-rod assembly including a piston rod made of composite materials substantially throughout the length of said piston rod, a non-integral piston head, and attachment means for attaching said non-integral piston head to said piston rod, said piston rod having oppositely facing ramp surfaces, and said piston head including plural parts each having a ramp surface for mating engagement with the respective ramp surfaces on said piston rod, and preload means for clamping said piston head parts together to maintain said piston head ramp surfaces in clamping engagement against said piston rod ramp surfaces to preload said piston head on said piston rod.

2. The fluid actuator of claim 1 further comprising coating means on the exterior surface of said piston rod to provide a sealing surface against fluid intrusion into said composite materials.

3. The fluid actuator of claim 1 wherein said piston rod is hollow and includes coating means on both the interior and exterior surfaces of said hollow piston rod to provide sealing surfaces against fluid intrusion into said composite materials.

4. The fluid actuator of claim 1 wherein said cylinder is a dual tandem cylinder containing a plurality of fluid chambers in series, and there are a plurality of non-integral piston heads connected to said piston rod for common movement therewith within said fluid chambers.

5. The fluid actuator of claim 1 wherein said cylinder is also made of composite materials.

6. A fluid actuator comprising a dual tandem cylinder including a plurality of fluid chambers in series, and a piston-rod assembly including a piston rod made of composite materials substantially throughout the length of said piston rod, a plurality of non-integral piston heads, and attachment means for attaching said non-integral piston heads to said piston rod for common movement therewith within said fluid chambers, said attachment means for one of said piston heads comprising mating ramp surfaces on said piston rod and said one piston head, said piston rod having oppositely facing ramp surfaces, and said one piston head including plural parts each having a ramp surface for mating engagement with the respective ramp surfaces on said piston rod, and preload means for clamping said one piston head parts together to maintain said one piston head ramp surfaces in clamping engagement against said piston rod ramp surfaces to preload said one piston head on said piston rod.

7. A fluid actuator comprising a cylinder including a fluid chamber for receiving a piston-rod assembly, said piston-rod assembly including a piston rod made of composite materials substantially throughout the length of said piston rod, a non-integral piston head connected to said piston rod, a rod end assembly, and attachment means for attaching said rod end assembly to the axial outer end of said piston rod, said piston rod being hollow, and said attachment means including an internal ramp on the inner diameter of said piston rod adjacent the axial outer end thereof, an internal metal stud received in the axial outer end of said piston rod, said stud having a conically ramped exterior surface adjacent the axial inner end of said stud in mating engagement with said internal ramp on said piston rod, and means for connecting said rod end assembly to the axial outer end of said stud.

8. The fluid actuator of claim 7 wherein said composite materials comprise plural layers of longitudinal and circumferential fibers substantially throughout the length of said piston rod, and said internal ramp on said piston rod is formed by interspersing filler means between said layers of longitudinal fibers to displace said longitudinal fibers radially inward.

9. The fluid actuator of claim 8 wherein said filler means comprises additional circumferential fibers interposed between said layers of longitudinal fibers.

10. The fluid actuator of claim 7 further comprising means for locking said rod end assembly against rotation relative to said metal stud.

11. The fluid actuator of claim 10 further comprising means for maintaining a preload force on said metal stud through said rod end assembly.

12. In a fluid actuator, a cylinder including a fluid chamber for receiving a piston-rod assembly, said piston-rod assembly including a piston rod made of composite materials substantially throughout the length of said piston rod, a non-integral piston head, and attachment means for attaching said non-integral piston head to said piston rod, said attachment means comprising mating ramp surfaces on said piston rod and piston head, said piston rod having two opposite facing ramp surfaces, and said piston head consisting of two parts each having a ramp surface for mating engagement with the respective ramp surfaces on said piston rod, and preload means including means for clamping said piston head parts together to preload said piston head parts against said oppositely facing ramp surfaces on said piston rod.

13. The fluid actuator of claim 12 wherein said oppositely facing ramp surfaces on said piston rod are formed by providing a radially outwardly extending built-up area circumferentially around said piston rod.

14. The fluid actuator of claim 13 wherein said composite materials comprise plural layers of longitudinal and circumferential fibers substantially throughout the length of said piston rod, and said built-up area is formed by progressively wrapping additional circumferential fibers between said longitudinal fibers in the region of said built-up area.

15. The fluid actuator of claim 14 wherein said additional circumferential fibers are progressively built-up from the opposite axial ends of said built-up area toward the center to cause outward deflection of the outermost layers of said longitudinal and circumferential fibers thus forming said oppositely facing ramp surfaces on the exterior of said piston rod.

16. The fluid actuator of claim 15 further comprising seal means between the exterior of said built-up area on said piston rod and said piston head to prevent across-the-head leakage.

17. In a fluid actuator, a cylinder including a fluid chamber for receiving a piston-rod assembly, said piston-rod assembly including a piston rod made of composite materials substantially throughout the length of said piston rod, a non-intergral piston head, and attachment means for attaching said non-integral piston head to said piston rod, said attachment means comprising mating ramp surfaces on said piston rod and piston head, preload means for preloading said piston head ramp surface against said piston rod ramp surface, said piston rod ramp surface being located adjacent the axial inner end of said piston rod and facing away from said axial inner end, and shoe means having said piston head ramp surface thereon in engagement with said piston rod ramp surface, said piston head being in threaded engagement with said shoe means.

18. The fluid actuator of claim 17 wherein said preload means comprises an inturned flange on the axial inner end of said piston head which engages the axial inner end of said piston rod during tightening of said piston head onto said shoe means to provide a preload force on said piston head.

19. The fluid actuator of claim 17 wherein said piston rod has an external groove, said piston rod ramp surface being formed by one side of said groove, and said shoe means including said piston head ramp surface extending into said groove and in mating engagement with said one side of said groove.

20. The fluid actuator of claim 19 wherein said shoe means comprises plural circumferentially extending shoe parts connected together during assembly onto said piston rod.

21. The fluid actuator of claim 20 wherein said shoe means includes two halves connected together by pin means during assembly onto said piston rod.

22. In a fluid actuator, a cylinder including a fluid chamber for receiving a piston-rod assembly, said piston-rod assembly including a piston rod made of plural layers of longitudinal and circumferential fibers substantially throughout the length of said piston rod, a non-integral piston head, and attachment means for attaching said non-integral piston head to said piston rod, said attachment means comprising mating ramp surfaces on said piston rod and piston head, and preload means for preloading said piston head ramp surface against said piston rod ramp surface, said piston rod having an external groove, and said piston rod ramp surface being formed by one side of said groove, said groove being formed using filler means between said layers of longitudinal fibers adjacent opposite sides of said groove.

23. The fluid actuator of claim 22 wherein said filler means comprises additional circumferential fibers interspersed between said fiber layers.

24. The fluid actuator of claim 22 wherein said filler means comprises additional circumferential fibers wrapped around said longitudinal fibers.

25. In a fluid actuator, a cylinder including a fluid chamber for receiving a piston-rod assembly, said piston-rod assembly including a piston rod made of composite materials substantially throughout the length of said piston rod, a non-integral piston head, and attachment means for attaching said non-integral piston head to said piston rod, said attachment means comprising mating ramp surfaces on said piston rod and piston head, preload means for preloading said piston head ramp surface against said piston rod ramp surface, said piston rod being hollow, a rod end assembly, and attachment means for attaching said rod end assembly to the axial outer end of said piston rod, said attachment means including an internal ramp on the inner diameter of said piston rod adjacent the axial outer end thereof, an internal metal stud received in the axial outer end of said piston rod, said stud having a conically ramped exterior surface adjacent the axial inner end of said stud in mating engagement with said internal ramp on said piston rod, and means for connecting said rod end assembly to the axial outer end of said stud.

26. The fluid actuator of claim 25 wherein said composite materials comprise plural layers of longitudinal and circumferential fibers substantially throughout the length of said piston rod, and said internal ramp on said piston rod is formed by interspersing filler means between said layers of longitudinal fibers to displace said longitudinal fibers radially inward.

27. The fluid actuator of claim 26 wherein said filler means comprises additional circumferential fibers interspersed between said layers of longitudinal fibers.

28. The fluid actuator of claim 25 wherein said means for connecting said rod end assembly to the axial outer end of said stud comprises a threaded connection therebetween.

29. The fluid actuator of claim 25 further comprising a stepped shoulder at the axial outer end of said piston rod, and a metal washer interposed between the axial outer end of said piston rod and the axial inner end of said rod end assembly, said washer having a stepped axial inner end corresponding in shape to said stepped shoulder on said piston rod for engagement therewith.

30. The fluid actuator of claim 25 further comprising means for transmitting a preload force from said rod end assembly to said metal stud.

31. The fluid actuator of claim 25 further comprising means for locking said rod end assembly against rotation relative to said metal stud.

32. The fluid actuator of claim 25 further comprising sensing means extending interiorly within said piston rod for sensing the position of said piston-rod assembly, said sensor means including a movable core attached to the axial inner end of said metal stud for axial movement therewith.

33. A fluid actuator comprising a dual tandem cylinder including a plurality of fluid chambers in series, and a piston-rod assembly including a piston rod made of composite materials substantially throughout the length of said piston rod, a plurality of non-integral piston heads, and attachment means for attaching said non-integral piston heads to said piston rod for common movement therewith within said fluid chambers, said attachment means for one of said piston heads comprising ramp surfaces on said piston rod and said one piston head, and preload means for preloading said one piston head against said piston rod ramp surface, said attachment means for said one piston head including two oppositely facing ramp surfaces on said piston rod, and said one piston head comprising two parts each having a ramp surface for mating engagement with the respective ramp surfaces on said piston rod, and said preload means including means for clamping said piston head parts of said one piston head together to preload said piston head parts against said oppositely facing ramp surfaces on said piston rod.

34. The fluid actuator of claim 33 wherein said composite materials comprise plural layers of longitudinal and circumferential fibers substantially throughout the length of said piston rod, and said oppositely facing ramp surfaces on said piston rod are formed by providing a radially outwardly extending built-up area extending circumferentially around said piston rod intermediate the length of said piston rod, said built-up area being formed by progressively wrapping additional circumferential fibers between said fiber layers in the region of said built-up area, said additional circumferential fibers being progressively built-up from the opposite axial ends of said built-up area toward the center to cause outward deflection of the outermost layers of fibers thus forming said oppositely facing ramp surfaces on said piston rod.

35. A fluid actuator comprising a dual tandem cylinder including a plurality of fluid chambers in series, and a piston-rod assembly including a piston rod made of composite materials substantially throughout the length of said piston rod, a plurality of non-integral piston heads, and attachment means for attaching said non-integral piston heads to said piston rod for common movement therewith within said fluid chambers, said attachment means for one of said piston heads comprising ramp surfaces on said piston rod and said one piston head, and preload means for preloading said one piston head against said piston rod ramp surface, said attachment means for another of said piston heads comprising another ramp surface adjacent the axial inner end of said piston rod and facing away from said axial inner end, and shoe means having ramp surface means thereon in engagement with said another piston rod ramp surface, said another piston head having threaded engagement with said shoe means.

36. The fluid actuator of claim 35 wherein said preload means for said another piston head comprises an inturned flange on the axial inner end of said another piston head which engages the axial inner end of said piston rod during tightening of said another piston head onto said shoe means to provide a preload force on said another piston head.

37. The fluid actuator of claim 36 wherein said piston rod has an external groove adjacent the axial inner end thereof, said another piston rod ramp surface being formed by one side of said groove, said shoe means including said ramp surface means extending into said groove, said shoe means comprising plural shoe parts which are connected together during assembly onto said piston rod.

38. The fluid actuator of claim 37 wherein said composite materials comprise plural layers of longitudinal and circumferential fibers substantially throughout the length of said piston rod, and said groove is formed using filler means between said layers of fibers adjacent opposite sides of said groove.

39. The fluid actuator of claim 38 wherein said filler means comprises additional circumferential fibers between said layers of fibers.

* * * * *